United States Patent
Hander et al.

(10) Patent No.: US 7,037,546 B2
(45) Date of Patent: *May 2, 2006

(54) METHOD FOR MAINTAINING DESIGNED FUNCTIONAL SHAPE

(75) Inventors: Jennifer Elizabeth Hander, Frisco, TX (US); Brian Peter Jacoby, Plano, TX (US); Joseph William Kelly, Grapevine, TX (US); Donald Vaughn Neel, Highland Village, TX (US); Mary Parsons, Plano, TX (US); Darrell Lee Taylor, Dallas, TX (US); Nolvia Elizabeth Zelaya Montes, Jalisco (MX)

(73) Assignee: Frito-Lay North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/862,299

(22) Filed: Jun. 7, 2004

(65) Prior Publication Data

US 2005/0013918 A1    Jan. 20, 2005

Related U.S. Application Data

(63) Continuation-in-part of application No. 10/198,531, filed on Jul. 18, 2002, now Pat. No. 6,893,673.

(51) Int. Cl.
*A21D 2/00*    (2006.01)

(52) U.S. Cl. ............ 426/560; 426/438; 426/439; 426/653; 426/808

(58) Field of Classification Search ........... 426/560, 426/808, 439, 438, 96, 653
See application file for complete search history.

(56) References Cited

U.S. PATENT DOCUMENTS

| | | | |
|---|---|---|---|
| 2,905,559 A | 9/1959 | Anderson et al. | |
| 2,916,378 A | 12/1959 | Kunce et al. | |
| 3,608,474 A | 9/1971 | Liepa | |
| 3,883,671 A | 5/1975 | Shatila | |
| 4,761,290 A * | 8/1988 | Meraj et al. | 426/90 |
| 4,861,609 A | 8/1989 | Willard et al. | |
| 4,889,733 A | 12/1989 | Willard et al. | |
| 4,931,303 A | 6/1990 | Holm et al. | |
| 4,994,295 A | 2/1991 | Holm et al. | |
| 4,999,208 A | 3/1991 | Lengerich et al. | |
| 5,928,700 A | 7/1999 | Zimmerman et al. | |
| 5,980,967 A | 11/1999 | Cary et al. | |
| RE36,785 E * | 7/2000 | Colson et al. | 426/551 |
| 6,129,939 A | 10/2000 | Fink et al. | |
| 6,346,287 B1 | 2/2002 | Ibuki et al. | |
| 6,393,804 B1 | 5/2002 | Ausnit | |
| 6,406,737 B1 | 6/2002 | Cain et al. | |
| 6,863,915 B1 * | 3/2005 | Huxel | 426/312 |

* cited by examiner

*Primary Examiner*—Lien Tran
(74) *Attorney, Agent, or Firm*—Colin P. Cahoon; Carstens & Cahoon, LLP

(57) ABSTRACT

An improved method for maintaining a designed functional shape in fabricated, expanded snack products by utilizing discrete, solid lipid particles. These lipids must be solid at room temperature with a melting point above 100° F. such that they remain discrete and solid when mixed with the dough and are subsequently sheeted or extruded. During the toasting, frying, or baking step, the solid lipid particles melt and soften and disrupt the starch matrix, thus allowing steam to escape and preventing undesirable defects such as excessive blistering, pillowing, and other shape defects that prevent the intended functionality. The addition of solid lipid particles, however, prevents steam accumulation only in the localized area where a solid lipid particle exists. Thus, by changing the level of solid lipid particles in the dough, the degree of shape deformities can be controlled.

19 Claims, No Drawings

METHOD FOR MAINTAINING DESIGNED FUNCTIONAL SHAPE

CROSS-REFERENCE TO RELATED APPLICATION

This application is a continuation-in-part of U.S. application Ser. No. 10/198,531 entitled "Method For Controlling Snack Product Blistering Through The Use Of Solid Lipid Particles" and filed on Jul. 18, 2002 now U.S. Pat. No. 6,893,673.

BACKGROUND OF THE INVENTION

1. Technical Field

The present invention relates generally to a method for making snack food products having a functional or specified shape. More particularly, the invention relates to a method of using solid lipid particles for the purpose of preventing undesirable deformation due to steam evolution while processing fabricated, expanded snack products.

2. Description of Related Art

Many types of fabricated snack products exist, both baked and fried. These snacks are commonly made by preparing a moist dough comprised of farinaceous materials. The dough is formed, such as by extrusion or by rolls, into a thin sheet. Upon frying or baking, the moisture within the dough is converted to steam, which causes the pieces to expand. With proper control of formulation and baking/frying conditions, known to one skilled in the art, the expanding steam will form voids within the product that will be maintained in the final product. These voids (also known as blisters, or bubbles) result in a less dense snack, which is crisp and appetizing without being too hard and dense to chew.

Under some conditions of baking/frying, however, undesirably large blisters (greater than 1.5 inches in the longest dimension), or bubbles, can form. This is common when frying above 300° F. or baking above 400° F. (or with high air velocities). These large blisters are the result of accumulation of steam between the outer surfaces of the dough pieces during frying or baking. The outer surfaces of the snack piece lose moisture faster than the center of the piece, due to more rapid heat transfer at the surface when frying or baking. When this surface dries sufficiently, it forms a "skin" or "crust" which can prevent escape of steam from the interior of the piece. The trapped steam causes the sides of the dough piece to separate, or delaminate, forming a hollow void. When the void is approximately as large on its surface as the surface area of the piece, this phenomena is commonly referred to as "pillowing." Excessive blisters, large blisters, and pillowing can detract from the appearance of the snack, and can break, causing holes in the product.

Furthermore, accumulation of steam within baking or frying pieces of dough can also cause shape deformations in the final product. For example, steam trapped near the surface of an otherwise flat piece of baking or frying dough will expand as it absorbs more heat and tries to escape. As the steam expands, it will push the surrounding dough outwards. The forces exerted upon the dough, in addition to causing delamination, can cause the dough piece to warp or otherwise distort from the desired shape. In products having a designed functional shape, such distortions in shape caused by trapped steam can prevent the resulting product from functioning as designed.

In the prior art, form fryers have been used to control the resulting shape of frying food products. For example, U.S. Pat. No. 6,129,939, granted to Fink, et al., discloses a process for making a shaped snack chip using form frying. A form fryer produces a shaped snack chip by placing chips into a shaped mold cavity and frying the chip therein. Form frying, however, requires a specialized fryer manufactured specifically to accommodate the molds. Such a fryer is more complex and has a relatively lower manufacturing capacity compared to a free fryer.

There is considerable prior art directed to controlling the size of blisters and eliminating pillowing. One method is to use low temperatures of baking or frying. These low temperatures result in extended baking/frying times that give the steam time to escape without forming a void. Low bake/fry temperatures, however, usually result in a less crisp, or less "chip-like" texture.

Another means known in the prior art for controlling blister sizes is to use a very thin dough sheet, meaning a sheet of dough having a thickness of less than 0.030 inches. In a thin dough sheet, the skin thickness is not sufficient to prevent steam from escaping from the product, so large voids, or blisters, do not form. Doughs which are sheeted to thicknesses over 0.030 inches, however, are prone to the formation of large, undesirable blisters.

Another means to control blisters is to include large, dry, dense, food particles in the dough. This has previously been detailed by Willard, et al. (U.S. Pat. No. 4,861,609) and is commonly done in tortilla chips by including granular pieces of the corn horny endosperm in the chip. These large, dry particles do not form a cohesive skin so they provide a means for moisture to escape, so as to reduce pillowing and undesirably large blisters. Kunce (U.S. Pat. No. 2,916,378) also details that coarsely ground particles create a discontinuous matrix from which steam can escape. These large, dry particles can detract from the appearance of the product, however, and result in a gritty texture.

Shatila, et al. (U.S. Pat. No. 3,883,671) discloses a method for reducing surface blisters by moistening the surface of the dough pieces after forming, but before frying. This moistening of the surface most likely reduced the formation of a surface "skin" during frying, and thus reduced blister formation. Moistening the surface prior to baking or frying, however, will increase the necessary baking or frying time, as well as altering the texture and appearance of the surface of the snack product.

Mechanical means can also be used to prevent pillowing or minimize blister size. Anderson, et al. (U.S. Pat. No. 2,905,559) avoids pillowing/blistering by perforating the dough sheet with spikes. Willard, et al. (U.S. Pat. No. 4,889,733) uses a rotating bristle brush to form dockering holes. Dockering holes are used in the Willard process to prevent pillowing. Perforating a dough sheet does reduce pillowing/large blisters, by providing holes for the steam to escape through, but results in holes or dimples or the final product, which may be undesirable.

Liepa, et al. (U.S. Pat. No. 3,608,474) teaches confining the dough pieces within a mold to prevent large blisters from forming. This results in a more complicated and expensive manufacturing process.

Carey, et al. (U.S. Pat. No. 5,980,967) discloses a formulation, and hydration procedure, to control blistering in a baked, snack product. Two patents issued to Holm, et al. (U.S. Pat. No. 4,931,303 and U.S. Pat. No. 4,994,295) detail a process of partially drying the surface of a dough layer, thus producing a preform having a dry outer layer and a wet inner layer. Such a procedure results in a more complex manufacturing procedure. The Holm, et al. patents also disclose the procedure of allowing a dough to equilibrate for a few minutes, prior to frying, to control blisters. This is also commonly done in the tortilla manufacturing process. The equilibration time produces more uniform distribution of water within dough, as well as reduces the moisture content by evaporation. This lower moisture content, for example about 25% by weight, uniformly distributed in the snack dough, will create smaller blisters than doughs that have a localized area with high moisture where a blister will form. This equilibration time can be rate limiting, however, and the necessary equilibration time increases with thicker doughs. Similar results can be obtained by excessively pre-baking the product, but this can lead to burnt chips and other unfavorable chip characteristics.

Added ingredients can also be used to reduce blistering. Zimmerman, et al. (U.S. Pat. No. 5,928,700) described adding emulsifiers to fried snack products to reduce pillowing/blistering. Emulsifiers can affect the moisture holding characteristics of the dough, or minimize the moisture necessary to create the dough, both of which can reduce pillowing and large blisters. Zimmerman, et al. state that in their formulation it is important to disperse and thoroughly mix the emulsifier with the other ingredients and it is preferable to dissolve the emulsifier prior to the mixing step. Further, the use of "solid" lipids in Zimmerman only refers to fats that are solids at room temperature but are actually liquefied as part of the mixing/dispersion step. No mention is made of any resultant discrete, solid particles of lipid over 0.010 inches in diameter, and it is noted that the emulsifier had an effect on the texture of the product. Use of lipids in a liquid state in the dough, or lipids which become plastic or liquid during dough formation, or solid lipids in a fine powder will result in a thorough distribution of the lipid throughout the dough during mixing/sheeting with no localized area of discrete lipid larger than 0.010 inches. Such small droplets of liquid, plastic, or fine powder lipid will enhance interaction of the lipid with the starches in the dough, which will alter the texture and properties of the final product. Also, a liquid, plastic, or fine powder lipid, when finely distributed in a dough as small droplets or powder, will reduce pillowing/blistering but will also reduce the formation of the desirable blisters (0.125 inches to 1.5 inches) necessary to create a crispy, chip-like texture and appealing, less "processed" surface appearance. This will result in a less expanded, denser, texture.

Lengerich, et al. (U.S. Pat. No. 4,999,208) used lipid-encapsulated particles to deliver additives in fabricated products. These lipid containing particles were not solid above 100F, and were not used for blister control.

It should be understood that production of many chip-like products that are ultimately fried or baked often go through a mixing and sheeting process which, depending on ambient conditions, can result in a final dough temperature of between 60° F. and 110° F. Consequently, any lipid added to the dough with a melting point below the temperature level that the product reaches during this stage will melt and become a liquid. In addition, even if a lipid has a complete melting point above 110° F., it may still have significant levels of liquid lipids present below 110° F. Once a lipid becomes a liquid during the mixing/sheeting step, it will disperse in the dough and not only reduce pillowing/large blisters on the product, but also will reduce desirable blister levels. For example, in tortilla chips, it is desirable to have small to medium sized blisters along the surface of the chip. These desirable blisters, typically in the range of 0.125 inches to 1.5 inches in diameter, are reduced when a liquid or solid lipid with a low melting point is added to the dough during dough formation.

Lipids with melting points above such processing temperatures, for example lipids having a melting point above 140° F. and IV values below 15, are available in the prior art, but only in powdered (less than 0.010 inches in largest dimension) or flaked (greater than 0.70 inches in largest dimension) form. The addition of a powdered lipid having a high melting point to a dough can reduce pillowing but will also reduce desirable sized blisters. The addition of lipids with a high melting point in a flake form will resolve the pillowing/large blisters problem while maintaining desirable size blisters. However, lipid flakes cannot be used in products having a thickness between 0.030 inches and 0.055 inches because such flakes typically have a diameter (greater than 0.070 inches) large enough that holes in the product are left when the large lipid flakes are subjected to cooking temperatures by either baking or frying.

However, few prior art methods, if any, exist for maintaining a designed functional shape or otherwise desired shape when baking and/or frying, especially when performed without molds. Snack chips and other food products are frequently made to assume a desired shape. Often, these shapes are merely ornamental in design to assume an interesting shape that appeals to consumers. Sometimes, snack product shapes assume a utilitarian function. One such function is to retain liquid mixtures such as dip, salsa, bean dip, cheese dip, and the like.

When a consumer chooses to eat a chip with dip, the consumer typically holds a single chip and immerses a portion of the chip into the dip. The consumer then transfers the dipped chip to his mouth for eating. However, the desired quantity of dip often fails to adhere sufficiently to the chip or is lost during the transfer process. This problem is particularly noticeable when the chip is flat or relatively flat. Additionally, round or triangular flat chips are often too large to insert into a jar or fail to retain a sufficient quantity of dip on the chip surface during removal of the chip from the jar. With traditional chips, some are too large to consume in one bite. When this occurs, the dip on the uneaten portion of the chip frequently slides off creating a mess and a dissatisfied consumer.

To help retain dip, snack chips have been made with curved surfaces. Shaped snack chips allow the consumer to scoop up a desired portion of dip without losing a significant quantity during transfer to the mouth for eating. Further, shaped chips are more maneuverable for insertion into a jar or can of packaged dip such as salsa. The utilitarian shapes known include for example ridges, scoops, taco-shaped, spoon-shaped, and bowl-shaped. Of these, a bowl-shaped chip is particularly desirable as it has a retaining wall or edge surrounding the entirety of the chip.

The process for making a shaped chip, especially a bowl-shaped chip, is more complex when compared to traditional chip manufacturing processes. With traditional chip production, the dough or masa is extruded or sheeted into a desired chip shape. The shaped chips may be toasted to add some stiffness prior to frying. To equilibrate moisture, the toasted chips are passed through a proofing stage. After proofing, the chips are transferred to a fryer for dehydration of the product for consumer packaging. Steam evolving from the frying chips tends to warp, bend, and blister the previously-flat chips, thus creating a product of variable shape. When making a specifically shaped product, however, the shape-altering forces of evolving steam can cause shape defects that destroy the product's intended functionality.

Consequently, a need exists for a method for maintaining a designed functional shape or otherwise desired shape in a snack food product having a pre-cooked thickness of 0.030 inches to 0.055 inches, a mixing/sheeting processing step requiring exposure of the product to temperatures from 60° F. to 130° F., and which is dehydrated without the use of cooking molds. In such instances, the prior art does not disclose a successful means of controlling the incidence and degree of blistering and shape deformation independent of thickness without: 1) the addition of coarse, gritty particles, 2) moistening the surface, 3) mechanical means which produce holes in the product or result in a complicated manufacturing procedure, 4) equilibrating the dough for extended periods of time, 5) or adding lipids in a liquid, plastic, or fine solid powder state which substantially interacts with the dough, modifies the resultant texture, and substantially reduces desirably-sized blisters. Such method should be simple and inexpensive to implement without changing the desirable organoleptic properties of the product.

SUMMARY OF THE INVENTION

The present invention is a method for maintaining a designed functional or otherwise desired shape and controlling defects in fabricated, expanded snack products by utilizing discrete, solid lipid particles having a high melting point and specific particle size. Such fabricated, expanded snacks are those made by preparing a moist dough comprised of farinaceous materials, including but not limited to: corn, potato, rice, oats, tapioca, wheat, lime-treated corn, buckwheat flour, bean flour, barley flour, wheat germ, rye flour, sorghum flour, graham flour, and mixtures thereof. These doughs may also include added starches, gelatinized or ungelatinized, as well as leavening ingredients and other fats or emulsifiers, as long as the solid, lipid particles are not dissolved in the other fats or emulsifiers. The moisture level of these doughs may range from 25% to 70% by weight of the total dough.

To this dough is then added solid, lipid particles having a high melting point and specific particle size. The lipid used can include triglycerides, mono or diglycerides, reduced-calorie fats, other emulsifiers, animal, marine or vegetable fat which can be partially or fully hydrogenated, nondigestable fats or oils, and reduced calorie fats and oils. These lipids must be solid at room temperature with a melting point above 110° F., preferably above 120° F., and even more preferably above 140° F., such that they remain discrete and solid when mixed with the dough and are subsequently sheeted or extruded. The lipid particles are added to the dough at a level of 0.05% to 5% by weight of the dough. The solid, lipid particles should have a particle size between 0.010 inches and 0.10 inches, preferably between 0.020 inches and 0.040 inches. The dough is then formed into a sheet, using rollers or extrusion. The addition of solid, lipid particles, disclosed in this invention, allows product thicknesses over 0.030 inches without the formation of large, undesirable blisters. Yet, desirably-sized blisters are still allowed to form.

The dough is extruded or sheeted, cut into pieces, which may or may not be toasted, and then fried or baked to reduce the moisture content of the final product below 4%. During the toasting, frying, and/or baking step, the solid lipid particles will melt locally and soften and disrupt the starch matrix to allow steam to escape, thus preventing blisters. The blisters are only prevented, however, in the localized area where a solid lipid particle exists. Desirably-sized blisters can still form in the area between lipid particles. Thus, by changing the level of solid lipid particles in the dough, the size of resulting blisters can be controlled. This control of blister size can be accomplished regardless of the thickness of the sheeted dough, dough composition, equilibration time, starch particle size in the dough, or whether the finished product is baked or fried.

Furthermore, solid lipid particles can also be used to maintain a designed functional shape or otherwise desired shape. By controlling the evolution of steam and preventing too much steam from building up within processing dough, shape deformation due to expanding steam can be controlled.

In addition, since the lipid particles only melt during the toasting, frying, or baking steps, (when the dough is quite viscous) there is not appreciable migration or interaction of the lipid particles with the bulk of the dough, so any effect on the overall texture of the dough and the resulting snack product is minimal. Also, by careful selection of the lipid source and particle size, these lipid particles are not apparent in the finished product and do not significantly affect the flavor of the finished product.

Consequently, the method provides an inexpensive means of maintaining the designed functional shape or otherwise desired shape in fabricated, expanded snack food products without greatly increasing processing costs or complexity. Further, the addition of the lipids described herein does not affect the taste or other desirable characteristics of the chip.

DETAILED DESCRIPTION

The present invention is an improved method for maintaining a designed functional or otherwise desired shape and for controlling defects in fabricated, expanded snack products by utilizing discrete, solid lipid particles having a high melting point and specific particle size. The lipid used can include triglycerides, mono or diglycerides, reduced-calorie fats, other emulsifiers, animal, marine or vegetable fat which can be partially or fully hydrogenated, nondigestable fats or oils, and reduced calorie fats and oils. These lipids must be solid at room temperature with a melting point above 110° F., more preferably above 120° F., and even more preferably above 140° F., such that they remain discrete and solid when mixed with dough and subsequently sheeted or extruded. These lipids should also have an Iodine Value ("IV") value below 15, more preferably below 10, and most preferably below 5. Use of solid particles with melting points below 110° F., or IV values above 15, can result in the lipid melting or softening during dough formation (mixing/sheeting). In such cases, the melted, or softened, lipid will then disperse into small particles (<0.010 inches) throughout the dough when mixed. These small, uniformly distributed lipid droplets form pathways that help steam exit the product during cooking. When there is an undesirably large concentration of small or low-temperature-melting lipid particles, the lipid particles may inhibit product puffing and the occurrence of desirably sized blisters to an undesirable extent. This results in a denser, harder texture, just as adding lipids in a liquid state causes the same phenomena. Examples of lipids having the appropriate melting point characteristics for the present invention include hydrogenated soybean oil, cotton seed oil, and other lipids having an iodine value below 5 and a melting point preferably above 140° F.

The lipid particles are added to the dough in accordance with the present invention at a level of about 0.1% to about 5% by weight of the dry material in the dough (dry basis). Using levels below 0.1% will result in comparatively large dough areas between individual lipid particles, thus increasing the risk that evolving steam will form large blisters or an unacceptable amount of product puffing or expansion. Too much product puffing or expansion can cause the product to warp, bend, and/or distort from its initial shape, especially if the puffing or expansion occurs unevenly across the surface of the product. Using levels over 5% or 6% will result in such small areas between lipid particles that even a desirable amount of blistering and product expansion will not occur, thereby producing a denser and harder texture. The most desirable level of solid, lipid particles for any given snack product is based on the thickness and density of the dough piece to be fried/baked, the size and density of the lipid particles used, and the desired amount of blistering and expansion in the final product. Yet another consideration is the amount of shape deformity due to expansion that is acceptable.

The solid, lipid particles should have a particle size between 0.010 inches and 0.10 inches. Particle sizes below 0.010 inches are too small to sufficiently disrupt the dough matrix and permit steam to escape. At elevated levels, particles below 0.010 inches can disrupt the dough matrix to such a degree that they will prevent not only pillowing but also the formation of desirably-sized blisters. The maximum lipid particle size cannot be greater than the dough thickness, for holes will appear in the final baked/fried snack product. For example, particles above 0.10 inches will leave visible holes in the product if the dough thickness is 0.10 inches or less.

The primary ingredient in the fabricated, expanded snack products described in this invention is a farinaceous flour or meal, including but not limited to: corn, potato, rice, oats, tapioca, wheat, lime-treated corn, buckwheat flour, bean flour, barley flour, wheat germ, rye flour, sorghum flour, graham flour, and mixtures thereof. Optional ingredients include starches (pregelatinized or cook-up, chemically modified or unmodified), leavening ingredients, proteins, and non-solid fats or emulsifiers—as long as the non-solid fats do not interact with the solid lipid particles to soften or dissolve them. The primary and optional ingredients are then preferably blended together, along with the solid, lipid particles and water to form a dough with a moisture range of from 25% to 70% of the weight of the total dough. The order of addition of the ingredients, and manner of mixing, can be varied as long as the resultant dough has uniformly distributed solid lipid particles that have not been reduced in size below 0.01 inches and do not interact with the surrounding dough.

The dough is then formed, such as by extrusion or by rolls, into a thin sheet ranging from 0.015 inches to 0.10 inches. This sheet is cut into pieces, which can be toasted, although this is not essential. If desired, the dough can be formed and cut into dough pieces having functional shapes or specifically designed shapes. The dough pieces are then fried or baked to reduce the moisture content of the final product below 4%. During the toasting, frying, or baking step, the solid lipid particles will melt. This softens and disrupts the starch matrix, thereby preventing excessive blistering by allowing steam to more easily escape. However, blisters are only prevented in the localized area where a solid, lipid particle exists. Desirable blisters (meaning typically blisters ranging in diameter from 0.125 inches to 1.5 inches, but certainly smaller than the surface area of the product) can still form in the area between lipid particles. Thus, by changing the level of solid lipid particles in the dough, the size of resulting blisters and the incidence of shape defects can be controlled. This control of blister size and defect incidence rate can be accomplished regardless of the thickness of the sheeted dough, dough composition, equilibration time, starch particle size in the dough, or whether the finished product is baked or fried.

In addition, since the lipid particles only melt during the toasting, frying, or baking step, (when the dough is quite viscous) there is not appreciable migration or interaction of the lipid particles with the bulk of the dough, so any effect on the overall texture of the dough and the finished snack product is minimal. By careful selection of the lipid source and particle size, these lipid particles are not apparent in the finished product and do not significantly affect the flavor of the finished product.

The following are examples of several embodiments of the present invention:

EXAMPLE 1

A dry feed of base materials is added to and mixed in a ribbon blender. The dry feed comprises the following by weight: 93.8% instant masa flour, 4.7% of an unmodified waxy corn starch, and 1.5% of solid lipid particles. The instant masa flour has a particle distribution of 0% on a U.S. #40 Standard sieve, 80% through a #60 U.S. Standard sieve and a moisture content of 11%. The solid, lipid particles are composed of 100% hydrogenated soybean oil with a maximum Iodine Value of 5, a melting point of over 150° F., and particles sizes such that 100% pass through a #18 U.S. Standard Sieve and 100% through a #60 U.S. Standard Sieve (particle size between 0.040 inches and 0.01 inches). The dry feed is mixed at 500 RPM in the ribbon blender to sufficiently mix the ingredients prior to being fed to the extruder for about one to two minutes.

Water is then added to the dry mix at a ratio of 4 parts water to 5 parts dry mix. This blend is then mixed in the ribbon blender for about 5 minutes to form a dough. This dough is then sheeted between rollers to form a thin, continuous sheet with a thickness of approximately 0.046 inches and a moisture content by weight of approximately 50%. This sheet is then cut by a cutter roll into individual shaped pieces, each piece having an approximate shape of a quarter circle (or pie wedge) with a radius of approximately 3 inches. Note, however, that innumerable shapes are possible. Possible product shapes include but are not limited to circles, ellipsis, squares, rectangles, polygons, and stars.

These shaped pieces are then passed through a toasting dryer to reduce their moisture prior to frying. This dryer has a residence time of 50 seconds and a temperature of 580° F. The dryer belting can be either mesh or slats, as is common in tortilla manufacturing, and the dryer can be single- or multi-pass. After exiting the toasting dryer, the moisture by weight of the shaped product pieces has been reduced to approximately 34%. Blisters will have formed in the dryer, because of steam escaping from the product, but less than 10% of the product will have blisters over 1.5 inches in diameter because of the action of the solid lipid particles. Because the product is still moist, the blisters are not set at this point and will flatten out as the product exits the fryer and cools.

The pieces are then allowed to condition for roughly three minutes at ambient conditions on open-mesh belting before dropping into a fryer. The shaped product pieces are fried in partially hydrogenated soybean oil at 375° F. for about 70 seconds until their moisture content decreases to between 0.5% and 3% by weight, more preferably 1.5%. During frying, the rapid escape of steam will create blisters, as well as reinflate pre-existing blisters that were formed in the toast oven. Again, less than 10% of the product will have blisters over 1.5 inches in diameter because of the solid, lipid particles. Furthermore, the incidence of shape defects is dramatically less than the incidence rate seen in a control sample made without solid lipid particles.

It should be noted, however, that the same process will produce significantly more undesirably-large blisters and shape defects if the solid lipid particles are not included in the ingredients. For instance, the same cooking process described above, when applied to a dry feed comprising by weight 95% instant masa flour and 5% of an unmodified waxy corn starch, produces product that is completely delaminated across the whole surface of the chip (100% pillowed). This is true even though all other processing conditions and moisture additions remain the same. Thus, the solid lipid particles clearly affect the manner of steam evolution, which in turn affects blistering and shape deformation.

EXAMPLE 2

A dry feed of base materials is added to and mixed in a ribbon blender. The dry feed comprises the following by weight:

| INGREDIENTS | % |
| --- | --- |
| Wheat Flour | 37.9 |
| Modified Starch | 19.0 |
| Soy Lecithin | 1.9 |
| Monocalcium Phosphate | 0.8 |
| Sodium Bicarbonate | 0.7 |
| White Maseca Flour | 38.6 |
| Solid lipid particles | 1.1 |

The dry feed is mixed in a ribbon blender for two minutes to sufficiently mix the ingredients. To this dry blend is then added one part partially hydrogenated soybean oil to sixteen parts dry mix (1:16). The soybean oil is warmed to 100° F. at which point it is completely liquid, but is not warm enough to melt the solid, lipid particles which are present in the dry blends. The solid, lipid particles are never added directly to the 100° F. oil. This mixture is then blended for another two minutes in the ribbon blender to disperse the oil.

Water is then added to the dry mix/oil blend at a ratio of 2 parts water to 5 parts dry mix/oil blend. This blend is then mixed in the ribbon blender for an additional 2.5 minutes to form a dough. This dough is then sheeted between two sets of opposing rollers. The first set of rollers has a slightly larger gap than the second set of rollers, such that the dough sheet is progressively pressed thinner as it passes through the two sets of rollers. The sheet exits with a final thickness of approximately 0.046 inches and a moisture content by weight of approximately 37%, at which point the sheet is then cut by a cutter-roll into individual shaped rectangular pieces. Note, however, that innumerable shapes are possible. Possible product shapes include but are not limited to circles, ellipsis, squares, rectangles, polygons, and stars.

These shaped pieces are then passed through a forced air oven. This oven has four temperature zones of 560° F./530° F./485° F./430° F. and provides a dwell time of 1.5 minutes, which will reduce the moisture of the product to about 16% by weight. These high temperatures will also cause the product to expand and form small blisters which impart a light, "chip-like" texture.

Next, the product is sent to a finishing dryer to further reduce the moisture content. The finishing dryer has a temperature of about 300° F. and a residence time of 12 minutes, at which point the moisture of the product will have been reduced to approximately 1.5% by weight. The resulting product has no single delaminated area over 1.5 inches in diameter. Furthermore, the incidence of shape defects is dramatically less than the incidence rate seen in a control sample made without solid lipid particles.

If the formula of Example 2 is used, except without the use of solid lipid particles, the resulting product is completely delaminated across the whole surface of the chip (100% pillowed). This is true even though all other processing conditions and moisture additions remain the same.

EXAMPLE 3

High-melting-point lipid particles are added to a dry mix based on starch and potato solids prior to adding water in a batch or continuous mixer to make dough. As previously explained, the lipid particle addition serves two main purposes: a) preserve any functional shape or desired shape that the product may have throughout the dehydration stages; and b) reduce the incidence of excessively-large blisters or puffing. The dough may also include other starches, leavening, and other fats and emulsifiers, as long as the solid lipid particles do not dissolve when mixed with such components at ambient temperatures.

The solid lipid particles must be solid at room temperatures with melting points above 100° F. and more desirably above 120° F. such that they remain discrete and solid when mixed with dough that is subsequently formed into functional shapes. The lipid particles are added to potato-based dough at a level of about 0.05% to 6% by weight of the dough and have particle sizes between about 0.005 inches and 0.070 inches, more preferably between 0.020 inches and 0.045 inches.

The lipid-particle-containing dough is formed into a shape having a functional benefit, preferably a concave scoop. Other shapes, however, are possible such as taco, oval taco, hexagonal taco, round saucer, canoe, spoon, oval, round, and more. In a preferred embodiment, the desired shape is three-dimensional and functions as a containing surface for holding dip, salsa, or another condiment or edible mixture. However, product shapes can also be designed to achieve other functional benefits such as easy mastication, maintaining a certain bulk density, and ensuring a desired level of structural rigidity. Although three-dimensional shapes are preferred, functional two-dimensional shapes are also acceptable for accomplishing certain functions such as providing the end user the ability to assemble the product pieces into a complete image or mosaic. For example, each product piece can be formed to exhibit the shape of a particular jigsaw-puzzle piece, with each piece contributing as part of a complete puzzle.

The thickness of the cut pieces ranges from about 0.015 inches to 0.080 inches. After the dough is cut into pieces, the functionally-shaped pieces are transported to a fryer filled with hot oil to reduce the moisture content of the final product to below approximately 4% by weight. During the heating process of frying, the solid lipid particles soften, melt, and locally disrupt the dough's starch matrix and allow steam to escape without widespread surface and shape deformation. Thus, the lipid particles help maintain functional shape and prevent excessive blistering and/or puffing defects. The localized disruption of the dough matrix that is required to allow moisture (generally in the form of steam) to escape occurs only in the localized areas where solid lipid particles reside. The degree of surface and shape deformation can therefore be controlled by changing the size and distribution of the solid lipid particles throughout the dough. This method can be adjusted to accommodate any change in processing parameters such as shape thickness, dough composition, proofing time, starch particle size, and method of dehydration.

In a preferred embodiment, the lipid particles only melt during the frying step when the dough is already quite viscous. Thus, there is little or no migration of particles or interaction with the bulk of the dough or its other components, and shape is not compromised by a flowing lipid material that reduces viscosity. With the proper selection of lipid particles, the lipid particles are not apparent in the finished product with respect to appearance, overall texture, and flavor.

In one embodiment, a combination of potato-based dry-mix, solid lipid particles, and water are extruded and then cut into pieces to form concave pre-form scoops. The concave preforms are then fried to produce concavely-shaped product pieces that function as scoops for retaining dip, salsa, or the like. The potato-based dry-mix of this particular embodiment comprises the following ingredients and their respective approximate weight-percentages: 30% to 70% potato flakes and/or potato granules; 0% to 15% water (preferably 11% to 15%), depending on the moisture content of the potato flakes and/or potato granules; 0% to 40% potato starches; 0% to 6% other starches; 0% to 5% emulsifiers; and 0% to 3% other ingredients. Note, however, that other dough compositions, such as those well-known in the prior art, can also be used with the present invention. Solid lipid particles having melting points of at least 100° F., preferably at least 120° F., and particle sizes roughly within the range of 0.020 inches and 0.045 inches are then added to and mixed with the dry ingredients in a suitable mixer or hopper. While the solid lipid particles are preferably added to the ingredients when dry, they can also be added to a wet mixture if desired. Once the solid lipid particles are evenly distributed with the ingredients, the resulting mixture is introduced into at least one extruder. Water is preferably introduced into the mixture as it is extruded, but water alternatively can be added to the dry mixture before entering the extruder. Note, however, that although the ingredients are formed into dough by extrusion in this particular example, other methods for forming potato-based dough, such as sheeting by rollers or kneading by hand, are acceptable for use with the present invention.

The extrusion process forms the dry-mix and water into a potato-based dough. Typical processing ranges for moisture content are about 42% to about 46% dough moisture, but other moisture contents can be used. Preferably, initial moisture content should be up to about 47%. Using high extrusion pressures, the dough can even be partially cooked during the extrusion process. At the end of the extruder (or last extruder), the extrudate is forced through a die that is shaped to give the extrudate a particular outline, curvature, or shape. The shaped extrudate is then cut into pieces as it exits the extruder. In a preferred embodiment, the extrudate is forced through a die having a curved or crescent-moon-shaped slit through which the extrudate passes. The die opening is such that the extruded dough exits as a concave ribbon that also curves or curls as it exits. In this manner, the dough pieces enter the fryer with a predetermined initial shape. Dough thickness after extrusion is preferably between 0.015 inches to 0.080 inches. The exiting concave ribbon is then cut into concave pieces, which may or may not be partially cooked. The cut pieces may be toasted to reduce the moisture content of the dough pieces to either an intermediate or the final moisture content, but toasting is not required. In a preferred embodiment, the dough pieces are simply placed into a fryer to reduce their moisture content to completion. Ideally, the fried dough pieces (dehydrated product pieces) exit the process with a pre-selected final shape that is identical to, or nearly identical to, the predetermined initial shape.

In comparing the incidence rates of shape defects in a control sample and test sample, one can see that the addition of high-melting-point solid lipid particles do indeed inhibit the incidence of shape defects during the dehydration stages. For example, in one experiment, dry potato-based dough ingredients were mixed with water, extruded, cut, and fried as described above. In the control sample, however, no solid lipid particles were added to the dry ingredients. In the test sample, solid lipid particles were added to the dry ingredients as described above, and the lipid particles comprised 2% by weight of the dry mixture. The dough pieces exiting the extruder had concave shapes designed to function as containers for holding condiments.

Post-frying shape defects were defined as any shape deformities preventing the product pieces from retaining condiments. Defectively-shaped product pieces included product pieces that were flattened, folded, or were convex rather than concave (caused by "pillowing") due to deformation while cooking. The most common shape defect seen was pillowing, which was caused when steam could not evolve from a dough piece quickly enough and expanded while still within the product. After the control sample and test sample were fried to a moisture content below 4%, more preferably about 1.5%, the occurrences of shape defects were tallied. More than 80% of the control sample product pieces were defective, whereas less than roughly 20% (more specifically, about 15% to about 20%) of the test sample product pieces were defective. The addition of solid lipid particles clearly prevented the product from undergoing significant shape defects while dehydrating. Thus, one can use solid lipid particles in processes for making snack products from farinaceous dough in order to reduce the incidence and degree of shape deformation during rapid dehydration phases such as frying, toasting, and/or baking.

The majority of the desirably-shaped product pieces had a concave shell shape having a length ranging from about 1.0 inches to about 3.0 inches, a width ranging from about 1.0 inches to about 3.0 inches, a depth ranging from about 0.25 inches to about 1.5 inches, and a concavity volume (or "open volume") ranging from about 0.25 cubic inches to about 6 or 7 cubic inches. Note, however, that these dimensions are merely exemplary; other dimensions and characteristics are also possible when using the method of the present invention.

In yet another embodiment, the method for maintaining a desired functional shape of the present invention comprises the following steps: a) providing a mixture of dough ingredients; b) adding a plurality of solid lipid particles to said mixture of dough ingredients, wherein said lipid particles have a largest dimension particle size of between about 0.005 inches and about 0.10 inches; c) forming the mixture of dough ingredients and the plurality of lipid particles into a plurality of dough pieces, each one having an initial shape; and d) dehydrating the dough pieces to form a plurality of dehydrated product pieces having an actual defect percentage that is no more than a pre-determined percentage of a hypothetical defect percentage; wherein said actual defect percentage is the percentage of dehydrated product pieces having shapes exceeding a predefined level of deformity, and further wherein said hypothetical defect percentage is the percentage of dehydrated product pieces having shapes exceeding the predefined level of deformity that would have been formed if said mixture of dough ingredients of step a) were formed into a plurality of hypothetical dough pieces and then dehydrated to form a plurality of hypothetical dehydrated product pieces. For example, if the end goal were to obtain product having 10% fewer defects than would be obtained without taking any active measures to maintain the desired shape ("hypothetical defect percentage"), then the pre-determined percentage would be 90%. Thus, the end goal in such a case would be to obtain an actual defect percentage that was no more than 90% of the hypothetical defect percentage.

This invention provides for a simple method of controlling and maintaining a functional shape or otherwise desired shape in a fabricated expanded snack product, where such method does not adversely affect processing times or the flavor of the finished product. The invention can be used with a variety of snack food products when the degree of shape deformation must be controlled.

While the invention has been particularly shown and described with reference to a preferred embodiment, it will be understood by those skilled in the art that various changes in form and detail may be made therein without departing from the spirit and scope of the invention.

What is claimed is:

1. A method for producing fabricated, expanded snack products that substantially maintain their pre-dehydrated shapes during dehydration, said method comprising the steps of:
   a) providing a mixture of dough ingredients;
   b) adding a plurality of solid lipid particles to said mixture of dough ingredients, wherein said lipid particles have a largest dimension particle size of between about 0.010 inches and about 0.10 inches;
   c) forming said mixture of dough ingredients and said lipid particles into a plurality of dough pieces, each one having a predetermined initial shape; and
   d) dehydrating said dough pieces to form a plurality of dehydrated product pieces;
   wherein said lipid particles prevent the dough pieces from undergoing significant shape deformation, and further wherein the dehydrating of step d) is accomplished by toasting followed by frying, such that said dehydrated product pieces each have a plurality of surface blisters, and said blisters generally have a diameter of between about 0.125 inches and about 1.5 inches.

2. The method of claim 1 wherein the solid lipid particles have a melting point above 110° F.

3. The method of claim 1 wherein the solid lipid particles have a melting point above 120° F.

4. The method of claim 1 wherein the solid lipid particles have a melting point above 140° F.

5. The method of claim 1 wherein the solid lipid particles have a largest dimension particle size of between 0.010 inches and 0.070 inches.

6. The method of claim 1 wherein the solid lipid particles have a largest dimension particle size of between 0.020 inches and 0.040 inches.

7. The method of claim 1 wherein the solid lipid particles are added at a level between 0.05% and 10.0% of the final product weight.

8. The method of claim 1 wherein the solid lipid particles are added at a level between 1.0% and 3.0% of the final product weight.

9. The method of claim 1 wherein the lipid is selected from a group consisting of triglycerides, mono or diglycerides, reduced-calorie fats, other emulsifiers, animal, marine or vegetable fat which can be partially or fully hydrogenated, nondigestable fats or oils, and reduced calorie fats and oils.

10. The method of claim 1 wherein said mixture of dough ingredients of step a) comprises potato-based materials.

11. The method of claim 1 wherein the snack product comprises farinaceous materials selected from the group consisting of corn, potato, rice, oats, tapioca, wheat, lime-treated corn, buckwheat flour, bean flour, barley flour, wheat germ, rye flour, sorghum flour, and graham flour.

12. The method of claim 1 wherein the snack product comprises added starches.

13. The method of claim 1 wherein the snack product comprises leavening ingredients.

14. The method of claim 1 wherein the snack product comprises other fats or emulsifiers, wherein further the solid lipid particles are not dissolved in such other fats or emulsifiers.

15. The method of claim 1 wherein the dough pieces initially have a moisture content of up to 47% by weight.

16. The method of claim 1 wherein the dough pieces have a thickness from about 0.015 inches to about 0.10 inches.

17. The method of claim 1 wherein the solid lipid particles have an IV value below 15.

18. The method of claim 1 wherein the solid lipid particles have an IV value below 10.

19. The method of claim 1 wherein the solid lipid particles have an IV value below 5.

* * * * *